United States Patent
Kanno et al.

(10) Patent No.: US 8,443,235 B2
(45) Date of Patent: May 14, 2013

(54) STORAGE SYSTEM AND KNOWN PROBLEM INFORMATION MANAGEMENT METHOD

(75) Inventors: Shinichiro Kanno, Odawara (JP); Toshimichi Kishimoto, Hadano (JP)

(73) Assignee: Hitachi, Ltd., Tokyo (JP)

( * ) Notice: Subject to any disclaimer, the term of this patent is extended or adjusted under 35 U.S.C. 154(b) by 719 days.

(21) Appl. No.: 12/664,323

(22) PCT Filed: Oct. 9, 2009

(86) PCT No.: PCT/JP2009/005272
§ 371 (c)(1), (2), (4) Date: Dec. 11, 2009

(87) PCT Pub. No.: WO2011/042937
PCT Pub. Date: Apr. 14, 2011

(65) Prior Publication Data
US 2011/0231711 A1    Sep. 22, 2011

(51) Int. Cl.
*G06F 11/00* (2006.01)
(52) U.S. Cl.
USPC ............................................. 714/42; 714/6.1
(58) Field of Classification Search .................. None
See application file for complete search history.

(56) References Cited

U.S. PATENT DOCUMENTS

| | | | |
|---|---|---|---|
| 6,742,141 B1 | 5/2004 | Miller | |
| 8,225,135 B2 * | 7/2012 | Barrall et al. | 714/6.1 |
| 2003/0005362 A1 * | 1/2003 | Miller et al. | 714/27 |
| 2005/0038832 A1 | 2/2005 | Feigenbaum | |

FOREIGN PATENT DOCUMENTS

| | | |
|---|---|---|
| JP | 2008-146360 A | 6/2008 |
| WO | WO 2008/091038 A1 | 7/2008 |

OTHER PUBLICATIONS

PCT International Search Report on International Application No. PCT/JP2009/005272 mailed Apr. 28, 2010, 4 pages.

* cited by examiner

*Primary Examiner* — Michael Maskulinski
(74) *Attorney, Agent, or Firm* — Foley & Lardner LLP

(57) ABSTRACT

Proposed are a highly reliable storage system capable of inhibiting the problematic operation or change of state in the storage system, and a known problem information management method capable of improving the reliability of the storage system. The storage system is provided with a storage apparatus including a storage medium for storing data, and a management apparatus for managing the storage apparatus. The management apparatus includes an apparatus-side known problem information storage unit for storing known problem information as information concerning a problematic operation or a change of state, a maintenance management terminal operation controller for receiving a user's operation or change of state and creating history information according to the operation or change of state, and an apparatus-side known problem information search unit for searching, from the apparatus-side known problem information storage unit, known problem information corresponding to the history information, wherein the maintenance management terminal operation controller inhibits the operation of the searched known problem information.

11 Claims, 10 Drawing Sheets

FIG. 5

KNOWN PROBLEM INFORMATION

| | |
|---|---|
| DOCUMENT NUMBER | 100 |
| DEGREE OF URGENCY | Serious |
| DISTRIBUTION - TARGET MODEL | STORAGE 5 |
| DISTRIBUTION-TARGET MICRO VERSION | 60-00-45/11-11 ~ 60-10-85/56-56 |
| RELATED KEYWORD | CVS |
| CONTENT | "THERE IS A CRITICAL PROBLEM IN CREATING A LOGICAL VOLUME WITH THIS MICRO VERSION." |
| CORRECTIVE ACTION | "UPDATING THE MICRO VERSION IS RECOMMENDED." |
| DATE AND TIME OF DISTRIBUTION | 2009/6/25 |
| PROBLEM OPERATION/CHANGE OF STATE INFORMATION | [SetCtr][Create_LogicalVolume][Any] |
| COUNTERMEASURE MICRO INFORMATION | 60-20-00/00-00 |
| CONTACT INFORMATION | 03-XXX-XXXXX |

FIG.6

APPARATUS INFORMATION GROUP

| SERIAL NUMBER | MODEL INFORMATION | VERSION OF MICRO PROGRAM | APPARATUS ADDRESS |
|---|---|---|---|
| 505521 | STORAGE 1 | 50-00-20/55-55 | 10.254.56.156 |
| 605897 | STORAGE 5 | 60-50-56/22-56 | 10.251.26.68 |
| 605976 | STORAGE 6 | 60-50-56/22-56 | 158.213.25.235 |
| 508935 | STORAGE 7 | 50-50-26/55-45 | 10.254.56.157 |

→ APPARATUS INFORMATION
→ APPARATUS INFORMATION
→ APPARATUS INFORMATION
→ APPARATUS INFORMATION

FIG.10

STORAGE MAINTENANCE PROGRAM

| PROBLEM① | PROBLEM② | PROBLEM③ |

[CONTENT OF OPERATION]
AFTER AUTOMATIC RELEASE OF EXCLUSIVE LOCK,
SETTING OPERATION WAS CONTINUED WITHOUT RELOADING SCREEN

[DESCRIPTION OF PROBLEM]
IT HAS BEEN IDENTIFIED THAT A FAULT SUCH AS INCONSISTENT
CONFIGURATION INFORMATION MAY OCCUR IN THE RELEVANT
OPERATION OF THIS VERSION OF THE MICRO PROGRAM

[PROBLEMATIC VERSIONS]
60-00-00/00~60-20-00/00

[CORRECTIVE ACTION]
IF THE EXCLUSIVE LOCK IS RELEASED, PLEASE MAKE SURE TO REDO
THE SETTING AFTER RELOADING THE SCREEN.
A MICRO PROGRAM THAT IS FREE OF THIS PROBLEM IS AVAILABLE.
PLEASE CONSIDER UPDATING THE MICRO PROGRAM.
IF YOU WISH TO UPDATE THE MICRO PROGRAM, PLEASE PUSH THE
[UPDATE] BUTTON.
PLEASE NOTE THAT THE APPARATUS WILL BE UNAVAILABLE FOR USE
DURING THE UPDATE.

[SERIAL NUMBER]
XXX

[DATE AND TIME OF DISTRIBUTION]
YYYY/MM/DD HH:mm:ss

[CONTACT INFORMATION]
YYYYY@YYYYY.com

CLOSE

APPLY   CANCEL

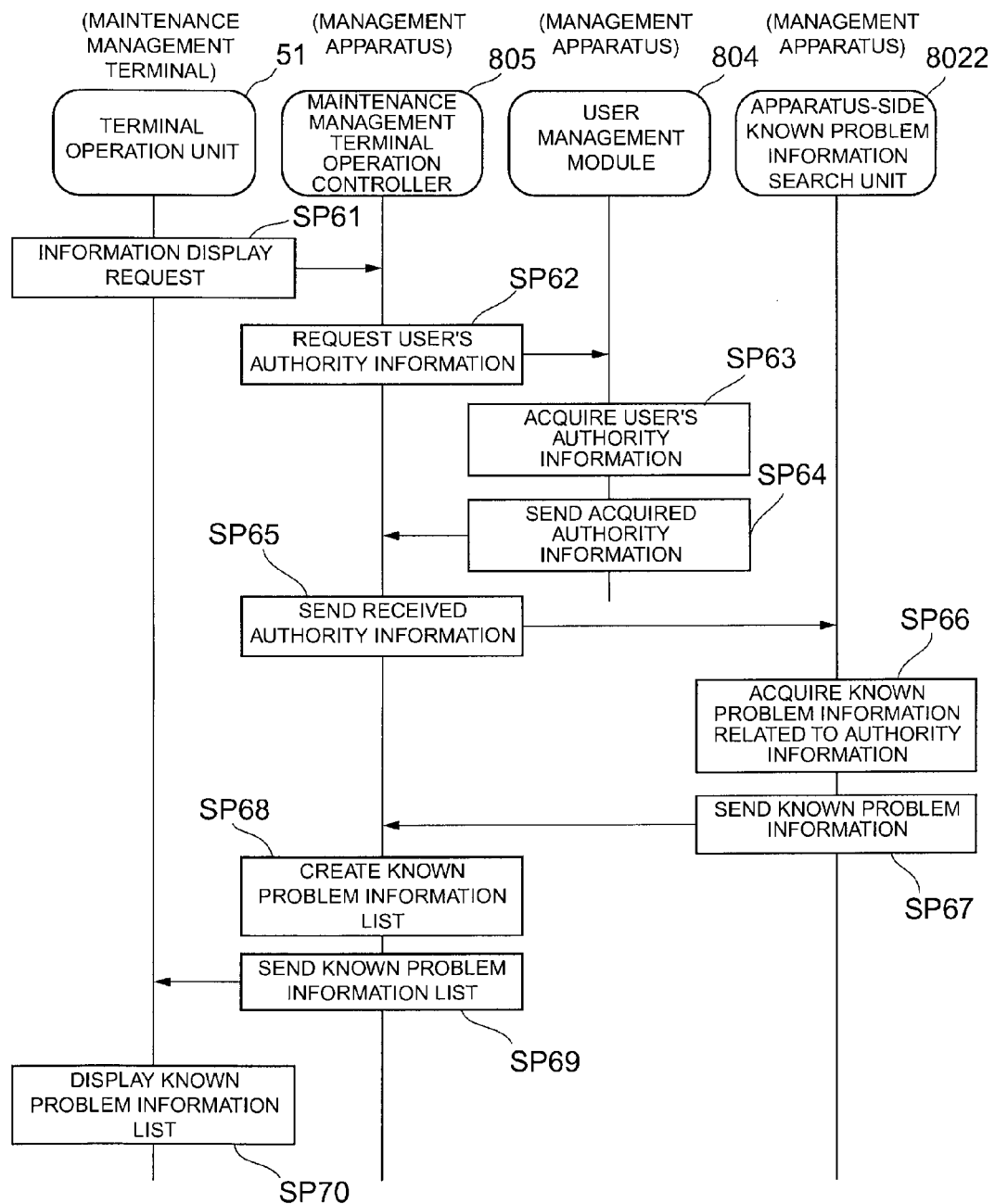

STORAGE SYSTEM AND KNOWN PROBLEM INFORMATION MANAGEMENT METHOD

TECHNICAL FIELD

The present invention generally relates to a storage system and its known problem information management method, and in particular relates to technology of managing known problem information such as information concerning problematic operations and change of status in a storage system.

BACKGROUND ART

Conventionally, if a vendor discovered a problem in a program of storage systems that have been shipped, the vendor notified users of information concerning that problem with a document. Here, a scheme is required for inhibiting the users from performing operations that will be problematic for the program.

For example, Patent Literature 1 discloses technology of inhibiting the startup of an application based on control information in a terminal device.

Citation List
Patent Literature

PTL 1: Japanese Unexamined Patent Publication 2008-146360

SUMMARY OF INVENTION

Technical Problem

Nevertheless, the technology described in Patent Literature 1 is for inhibiting the startup of an unnecessary application in a terminal device, and does not detect the problematic operation or change of state in a storage system and inhibit such operation or change of state.

The present invention was devised in view of the foregoing points. Thus, an object of this invention is to propose a highly reliable storage system capable of inhibiting the problematic operation or change of state in the storage system, and a known problem information management method capable of improving the reliability of the storage system.

Solution to Problem

In order to achieve the foregoing object, the present invention provides a storage system comprising a storage apparatus including a storage medium for storing data, and a management apparatus for managing the storage apparatus. In this storage system, the management apparatus comprises an apparatus-side known problem information storage unit for storing known problem information as information concerning a problematic operation or a change of state, a history information creation unit for receiving a user's operation or change of state and creating history information according to the operation or change of state, a known problem information search unit for searching, from the apparatus-side known problem information storage unit, the known problem information corresponding to the history information created by the history information creation unit, and an operation inhibition unit for inhibiting the operation of the known problem information that was searched by the known problem information search unit.

The present invention additionally provides a method of managing known problem information of a storage system comprising a storage apparatus including a storage medium for storing data, and a management apparatus including an apparatus-side known problem information storage unit for storing known problem information as information concerning a problematic operation or a change of state, and for managing the storage apparatus. This method comprises a first step of the management apparatus receiving a user's operation or change of state and creating history information according to the operation or change of state, a second step of the management apparatus searching, from the apparatus-side known problem information storage unit, the known problem information corresponding to the history information created at the first step, and a third step of the management apparatus inhibiting the operation of the known problem information that was searched at the second step.

Advantageous Effects of Invention

According to the present invention, it is possible to realize a highly reliable storage system and a known problem information management method capable of improving the reliability of the storage system.

BRIEF DESCRIPTION OF DRAWINGS

FIG. 5 is a conceptual diagram showing an example of known problem information.

FIG. 6 is a conceptual diagram showing an example of apparatus information.

FIG. 10 is a schematic diagram showing a display example of a known problem information list to be displayed on a maintenance management terminal.

FIG. 11 is a sequence diagram showing the flow of known problem information display processing.

REFERENCE SIGNS LIST

Figure 1:
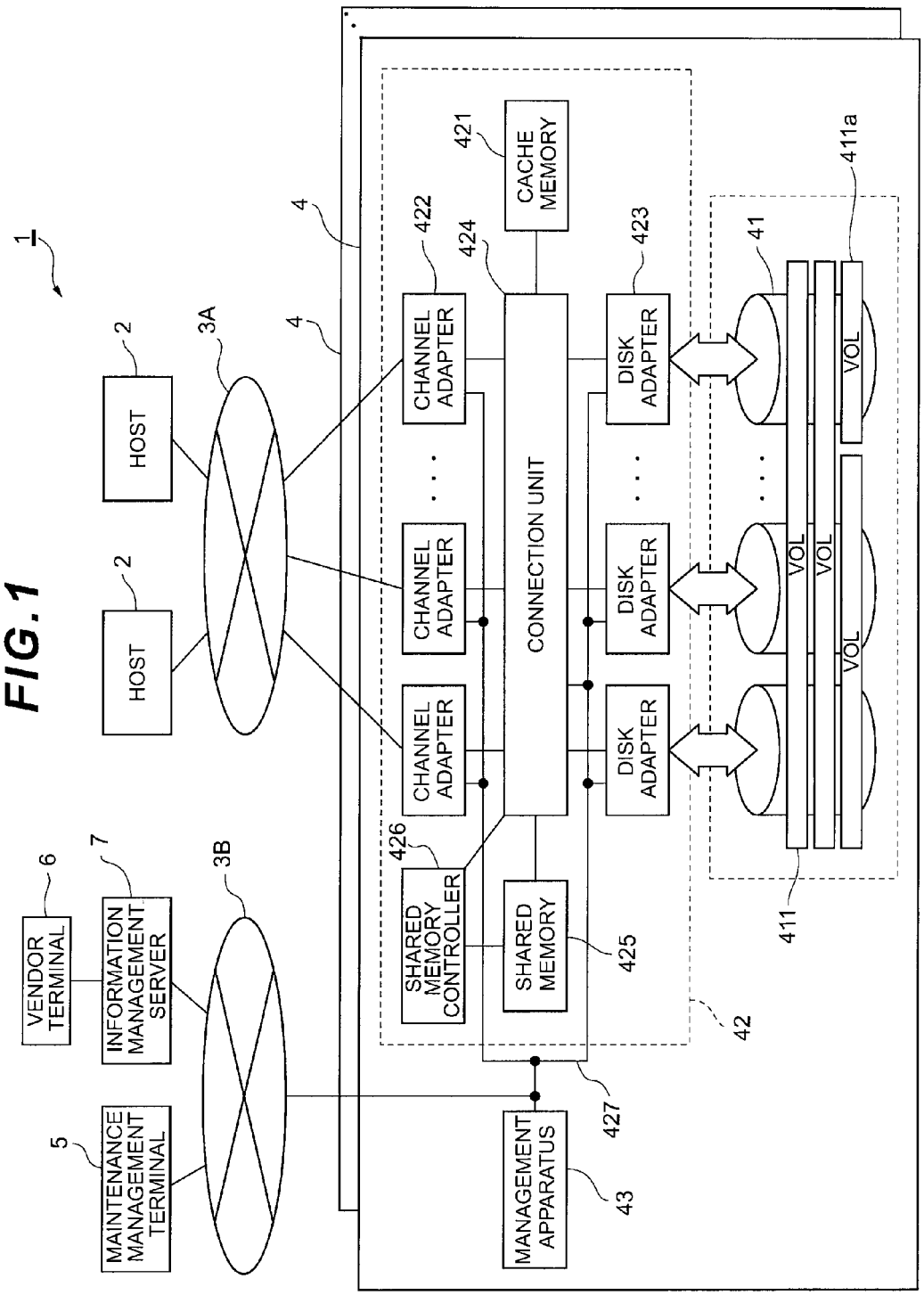
FIG. 1 is a block diagram showing the overall configuration of a storage system according to the present embodiment.

1 Storage system
2 Host
3A, 3B Network
4 Storage apparatus
5 Maintenance management terminal
6 Vendor terminal
7 Information management server
31 CPU
32 Memory
33 Local memory device
41 Disk device
42 Controller unit
43 Management apparatus
51 Terminal operation unit
331 Server-side known problem information storage unit
332 Apparatus information storage unit
321 Server-side known problem information management program 322 Apparatus information management program
411 Volume
421 Cache memory
422 Channel adapter
423 Disk adapter
424 Connection unit
425 Shared memory
427 Internal communication line
431 CPU
432 Memory
433 Local memory device
701 Server-side known problem information registration unit
702 Server-side known problem information search unit
703 Apparatus information registration unit
704 Apparatus information search unit
705 Known problem information distribution unit
801 Storage apparatus registration unit
802 Known problem information management module
803 History information management module
804 User management module
805 Maintenance management terminal operation controller
806 Storage apparatus configuration setting module
4331 Apparatus-side known problem information storage unit
4332 History information storage unit
4333 Authority information storage unit
4321 Apparatus-side known problem information management program
4322 History information management program
4323 Storage management program
8021 Apparatus-side known problem information registration unit
8022 Apparatus-side known problem information search unit
8031 History information collection unit

DESCRIPTION OF EMBODIMENTS

An embodiment of the present invention is now explained in detail with reference to the attached drawings.

(1) Hardware Configuration of Storage System According to Present Embodiment

FIG. 1 shows the overall storage system 1 according to the present embodiment. With the storage system 1, a host 2 is connected to a storage apparatus 4 via a first network 3A, and a maintenance management terminal 5 is connected to the storage apparatus 4 via a second network 3B. In addition, an information management server 7 is connected to the storage apparatus 4 via a second network 3B, and a vendor terminal 6 is connected to the information management server 7.

The host 2 is a user terminal in a business system of banks, a seat reservation business system of airline companies or the like and is configured, for example, from a personal computer, a workstation, a mainframe computer or the like. The host 2 is loaded with application software according to the business description of the user to use the host 2, and data to be used by the application software is read from and written into the storage apparatus 4 via the first network 3A. The first network 3A is configured, for example, from a SAN (Storage Area Network), Internet, or a dedicated line. Communication between the host 2 and the storage apparatus 4 via the first network 3A is conducted according to a fibre channel protocol if the first network 3A is a SAN.

The storage apparatus 4 is configured from a plurality of physical disks 41, a controller 42 for controlling the input and output of data to and from the physical disks 41, and a management apparatus 43.

The physical disk 41 is configured, for example, from an expensive disk such as a SCSI (Small Computer System Interface) disk or an inexpensive disk such as a SATA (Serial AT Attachment) disk or an optical disk. One RAID group is configured from one or more physical disks 41, and one or more logical volumes VOL are set on the physical storage areas provided by the respective physical disks 41 configuring the one RAID group. Data from the host is stored in the logical volumes VOL in block units (these are hereinafter referred to as the "logical blocks") of a prescribed size.

A unique volume number is assigned to each logical volume. In the case of this embodiment, the input and output of data is performed by using the combination of the volume number and the block number (LBA: Logical Block Address) of the logical block that is assigned to each logical block as the address, and designating such address.

The controller 42 comprises a plurality of channel adapters 422, a connection unit 424, a shared memory 425, a cache memory 421, and a plurality of disk adapters 423.

Each channel adapter 422 is configured as a micro computer system comprising a CPU, a memory, a communication interface and the like, and includes a port for connecting to the first network 3A. The channel adapter 422 executes various types of processing based on pre-installed micro programs. A network address (for instance, an IP address or a WWN) is assigned to the port of each channel adapter 422 for identifying the respective ports, and the respective channel adapters 422 are thereby able to individually function as a NAS (Network Attached Storage).

The connection unit 424 is connected to the channel adapters 422, the shared memory 425, the cache memory 421 and the disk adapters 423. The sending and receiving of data among the channel adapters 422, the shared memory 425, the cache memory 421 and the disk adapters 423 is conducted via the connection unit 424. The connection unit 424 is configured, for example, from a switch such as an ultra-fast crossbar switch or a bus for performing data transfer by way of high-speed switching.

The shared memory 425 is a storage memory to be shared by the channel adapters 422 and the disk adapters 423. The shared memory 425 is used mainly for storing system configuration information read from the system volume when the power of the storage apparatus 4 is turned on, and commands sent from the host 2.

The cache memory 421 is also a storage memory to be shared by the channel adapters 422 and the disk adapters 423. The cache memory 421 is used mainly for storing data to be input and output to and from the storage apparatus 4.

Each disk adapter 423 is configured as a micro computer system comprising a CPU, a memory and the like, and functions as an interface for performing protocol control during the communication with the respective physical disks 41. The disk adapters 423 are connected, for example, to the corresponding physical disks 41 via a fibre channel cable, and send and receive data to and from the physical disks 41 according to the fibre channel protocol.

Figure 2:
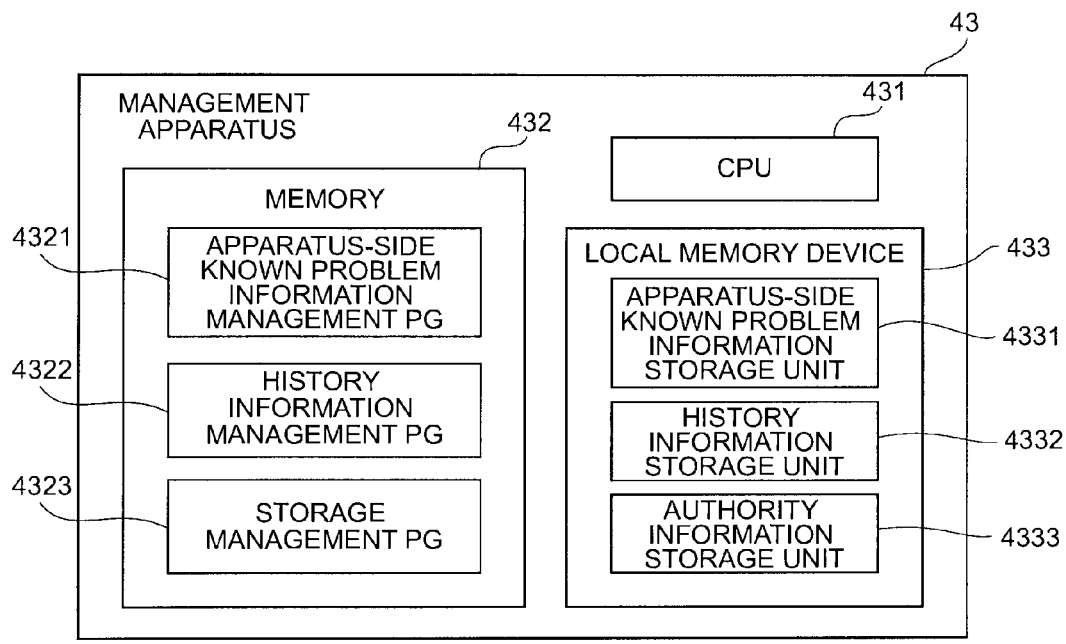
FIG. 2 is a block diagram showing the schematic configuration of a management apparatus.

The management apparatus 43 is a computer device for maintaining and managing the storage apparatus 4, and is connected to the respective channel adapters 422 and the respective disk adapters 423 via the internal communication line 427. The management apparatus 43 comprises, as shown in FIG. 2, information processing resources such as a CPU (Central Processing Unit) 431, a memory 432 and a local memory device 433.

The CPU 431 is a processor that governs the operational control of the overall management apparatus 43, and executes various programs stored in the memory 432. The memory 432 is used for retaining the various programs that are loaded from the local memory device 433. The apparatus-side known problem information management program 4321, the history information management program 4322 and the storage management program 4323 (all described later) are also retained in the memory 432. The local memory device 433 is used for retaining various programs and various types of data. The known problem information and authority information per user (all described later) are managed by being stored in the local memory device 433.

The maintenance management terminal 5 is a computer device to be used by an administrator of the storage apparatus 4 (this is hereinafter referred to as the "apparatus administrator") for maintaining and managing the storage apparatus 4, and is configured from a personal computer, a workstation, a mainframe computer or the like. The maintenance management terminal 5 accesses the management apparatus 43 of the storage apparatus 4 according to operations of the apparatus administrator and replaces the micro programs loaded in the storage apparatus with the latest version via the management apparatus 43, collects necessary information from the management apparatus 43, and displays the collected information.

The vendor terminal 6 is a computer device of the storage apparatus 4 that is installed on the vendor-side, and is configured from a personal computer, a workstation, a mainframe computer or the like. The vendor terminal 6 is used by an engineer, who recognized the occurrence of a problem caused by a specific operation made to the storage apparatus 4, for registering the known problem information concerning that operation or the like in the information management server 7.

Figure 3:
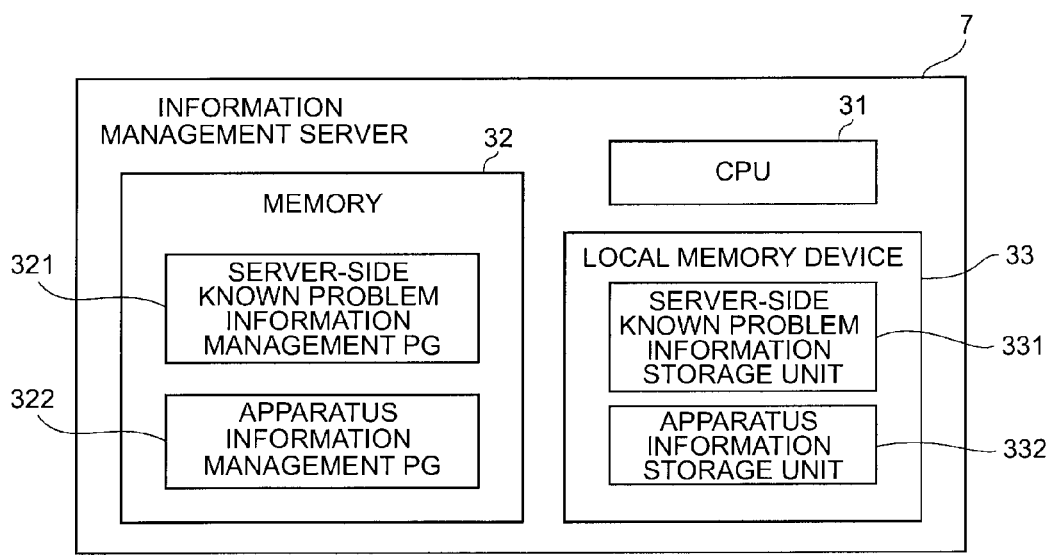
FIG. 3 is a block diagram showing the schematic configuration of an information management server.

The information management server 7 is a computer device of the storage apparatus 4 that is installed on the vendor-side, and comprises the function of distributing the known problem information registered by the vendor terminal 6 to the management apparatus 43 of the corresponding storage apparatus 4. The information management server 7 comprises, as shown in FIG. 3, hardware resources such as a CPU 31, a memory 32, and a local memory device 33.

The CPU 31 is a processor that governs the operational control of the overall information management server 7, and executes various programs stored in the memory 32. The memory 32 is used for storing various programs loaded from the local memory device 33. The server-side known problem information management program 321 and the apparatus information management program 322 (all described later) are also retained in the memory 32. The local memory device 33 is used for retaining various programs and various types of data. The known problem information registered in the vendor terminal 7 and the management information (apparatus information) (described later) for each storage apparatus 4 are managed by being stored in the local memory device 33.

The second network 3B is configured, for example, from a LAN (Local Area Network), Internet, or a dedicated line. Communication between the information management server 7 and the storage apparatus 4 via the second network 3B is conducted according to a TCP/IP (Transmission Control Protocol/Internet Protocol) protocol if the second network 3B is a LAN.

(2) Functional Configuration of Storage System According to Present Embodiment

Figure 4:
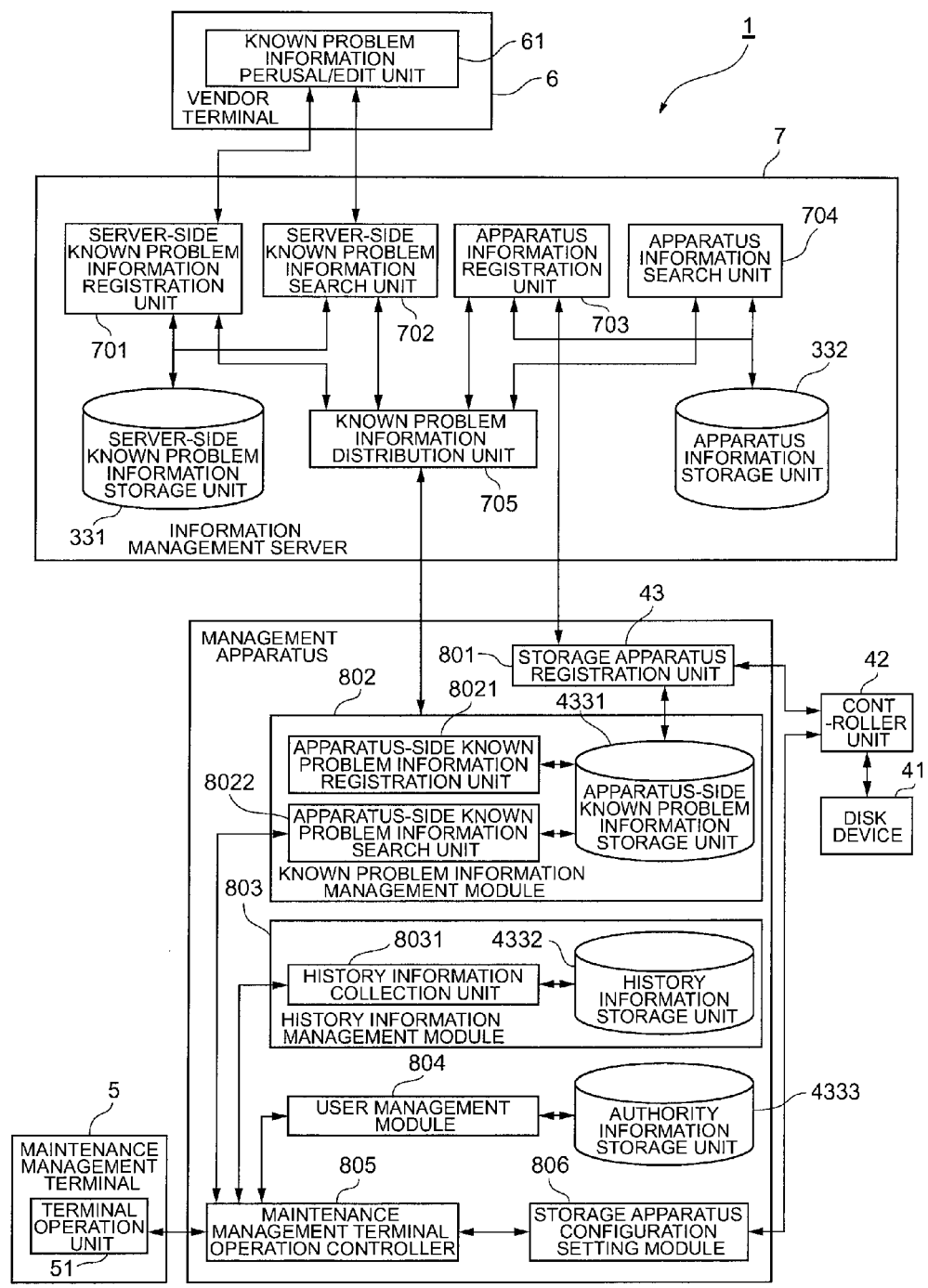
FIG. 4 is a block diagram showing the functional configuration of the storage system.

FIG. 4 shows the functional configuration of the storage system 1. As shown in FIG. 4, the vendor terminal 6 comprises a known problem information perusal/edit unit 61. The known problem information perusal/edit unit 61 is a function module that is formed as a result of a CPU (not shown) of the vendor terminal 6 executing the corresponding program that is stored in a memory (not shown) of the vendor terminal 6.

The known problem information perusal/edit unit 61 provides functions for displaying a GUI screen on the vendor terminal 6 to enable a user such as an engineer to register new known problem information in the information management server 7, or acquire the known problem information registered in the information management server 7 from the information management server 7 and to display such known problem information.

The known problem information is now explained. If a specific operation is performed with a management application of a storage system, problems such as inconsistent configuration information may arise due to defects in the micro program. This kind of problem that has already been discovered is referred to as a known problem, and information concerning such a known problem is referred to as known problem information. The known problem information includes various types of information concerning that problem.

In the case of this embodiment, the known problem information is configured, as shown in FIG. 5, 11 pieces of information including "document number," "degree of urgency," "distribution-target model," "distribution-target micro version," "related keyword," "content," "corrective action," "date and time of distribution," "problematic operation/change of state information," "countermeasure macro information" and "contact information."

Among the above, "document number" represents the document number of the corresponding known problem information, and "degree of urgency" represents the degree of urgency of the known problem information. The "distribution-target model" represents the model of the storage apparatus 4 to which the known problem information is to be distributed, "distribution-target micro version" represents the scope of the version of the target micro program, "related keyword" represents the related program product and its function, "content" represents the content of the text to be presented to the user regarding the description of the problem, "corrective action" represents the text regarding the corrective action to be taken to solve the problem, and "date and time of distribution" represents the data and time that the known problem information is to be distributed, respectively. Moreover, "problematic operation/change of state information" represents the information regarding the operation and state of change of the problematic application, "countermeasure macro information" represents the version of the micro program to become the countermeasure to the problem indicated in the known problem information, and "contact information" represents the contact information concerning that known problem information.

The "problematic operation/change of state information" of the known problem information is configured from 3 pieces of information; namely, "type," "item" and "additional information," and these 3 pieces of information are respectively represented in a format of being placed in brackets ([ ]) and enumerated.

Among the above, "type" represents the problematic operation or change of state. Included in the "type" are [CompCtr] which means component operation, [SetCtr] which means setting operation, [StsChg] which means change of state (state transition), and [Any] which means arbitrary operation.

Moreover, "item" represents the target or content of the problematic operation or change of state that is represented in the "type." In reality, "item" represents the component that may be subject to the known problem if it is operated when the "type" is [CompCtr] (for instance, the OK button of the information screen is [Information_OKBTN]), represents the operational content in which the problem will arise when executed when the "type" is [SetCtr] (for instance, the creation of a logical volume is [Create_LogicalVolume]), and represents the status in which the known problem may arise if the status is changed when the "type" is [StsChg] (for instance, exclusive lock is [Lock]). The "item" of [Any] represents an arbitrary operation.

Moreover, "additional information" represents the specific contents of the problematic operation or change of state. In reality, "additional information" represents the type of operation when the "type" is [CompCtr] (for instance, click is [Clik]), represents the operation target when the "type" is [SetCtr] (for instance, if it is a logical volume in which the logical unit number and the logical device number in a parity group having a parity group number of "1-1" are both "00," [Parity=1-1 CU:LDEV=00:00]), and represents the type of status that it entered when the "type" is [StsChg] (in the case of a correction, [modify]). The "additional information" of [Any] represents "arbitrary."

Thus, for example, when the "problematic operation/change of state information" is [CompCtr] [Information_OKBTN] [Click], this means that the problematic component operation is "the operation of clicking the OK button of the Information screen. Moreover, when the "problematic operation/change of state information" is [SetCtr] [Create_LogicalVolume] [Any], this means that the problematic setting operation is "the operation of creating an arbitrary logical volume," and when the "problematic operation/change of state information" is [SetCtr] [Create_LogicalVolume] [Parity=1-1 CU:LDEV=00:00 Size=100MB], this means that the problematic setting operation is "the operation of creating a 100 MB logical volume from a Parity=1-1 (CU:LDEV=00: 00)." In addition, when the "problematic operation/change of state information" is [StsChg] [LogicalVolumeListScreen] [SwitchDisplay], this means that the problematic change of state is to switch the screen and display the volume list screen. If the "type" is [Any], both the "item" and "additional information" will be [Any].

A specific example of the known problem information is shown in FIG. 5. This example shows a case where there is a known problem in the creation of a logical volume VOL, and shows that a problem will arise during the creation of a logical volume VOL. The "problematic operation/change of state information" may be registered in the known problem information as a plurality of patterns.

Returning to FIG. 4, the information management server 7 comprises a server-side known problem information registration unit 701, a server-side known problem information search unit 702, an apparatus information registration unit 703, an apparatus information search unit 704, a known problem information distribution unit 705, a server-side known problem information storage unit 331, and an apparatus information storage unit 332.

The server-side known problem information registration unit 701, the server-side known problem information search unit 702 and the known problem information distribution unit 705 are function modules that are configured by the CPU 31 of the information management server 7 explained above with reference to FIG. 3 executing the server-side known problem information management program 321 stored in the memory 32, and the apparatus information registration unit 703 and the apparatus information search unit 704 are function modules that are configured by the CPU 31 executing the apparatus information management program 322 stored in the memory 32. The server-side known problem information storage unit 331 and the apparatus information storage unit 332 are function modules that configured from a part of the storage area that is provided by the local memory device 33 of the information management server 7, respectively.

The server-side known problem information registration unit 701 includes a function of storing the known problem information provided from the known problem information perusal/edit unit 71 in the server-side known problem information storage unit 331, and the server-side known problem information search unit 702 includes a function of searching for the known problem information stored in the server-side known problem information storage unit 331.

The apparatus information registration unit 703 includes a function of receiving information concerning the corresponding storage apparatus 4 (this is hereinafter referred to as the "apparatus information") that is sent from the client's management apparatus 43, and storing the apparatus information in the apparatus information storage unit 332. The apparatus information search unit 704 includes a function of searching for the apparatus information stored in the apparatus information storage unit 332. The known problem information distribution unit 705 includes a function of distributing the known problem information stored in the server-side known problem information storage unit 331 to the required management apparatus 43 as needed.

The apparatus information is information for the information management server 7 to identify the storage apparatus 4 that is connected to the first network 3A (FIG. 1) and notify the necessary known problem information to the management apparatus 43 and is configured, as shown in FIG. 6, from a serial number of the storage apparatus 4, model information representing the model of the storage apparatus 4, a version of the micro program that is loaded in the storage apparatus 4, and an apparatus address of the storage apparatus 4.

Meanwhile, the management apparatus 43 comprises a storage apparatus registration unit 801, a known problem information management module 802, a history information management module 803, a user management module 804, a maintenance management terminal operation controller 805, a storage apparatus configuration setting module 806, and an authority information storage unit 4333.

The known problem information management module 802 is a function module that is configured by the CPU 431 of the management apparatus 43 explained above with reference to FIG. 2 executing the apparatus-side known problem information management program 4321 stored in the memory 432, and the history information management module 803 is a function module that is configured by the CPU 431 executing the history information management program 4322 stored in the memory 432. The storage apparatus registration unit 801, the user management module 804, the maintenance management terminal operation controller 805 and the storage apparatus configuration setting module 806 are function modules that are configured by the CPU 431 executing the storage management program 4323 stored in the memory 432. The authority information storage unit 4333 is a function module that is configured from a part of the storage area provided by the local memory device 433 of the management apparatus 34.

The storage apparatus registration unit 801 includes a function of sending and registering the apparatus information of the storage apparatus 4 to and in the information management server 7 during the startup of the storage apparatus 4 or after replacing the micro program loaded in the storage apparatus 4.

The known problem information management module 802 is a module for managing the known problem information, and comprises an apparatus-side known problem information registration unit 8021, an apparatus-side known problem search unit 8022, and an apparatus-side known problem information storage unit 4331. The apparatus-side known problem information registration unit 8021 includes a function of storing the known problem information sent from the information management server 7 in the apparatus-side known problem information storage unit 4331, and the apparatus-side known problem information search unit 8022 includes a function of searching for the known problem information corresponding to the history information from the apparatus-side known problem information storage unit 4331. The apparatus-side known problem information storage unit 4331 is configured from a part of the storage area provided by the local memory device 433 of the management apparatus 43.

The history information management module 803 is a module for managing the history information, and comprises a history information collection unit 8031 and a history information storage unit 4332. The history information collection unit 8031 includes a function of collecting history information as information concerning the historical data of the user's operation or change of state and storing such history information in the history information storage unit 4332, and the history information storage unit 4332 is configured from a part of the storage area provided by the local memory device 433 of the management apparatus 43.

Here, history information is information concerning the historical data of the user's operation or change of state, and is described in the same format as the "problematic operation/change of state information" in the known problem information. For example, if the user performs an operation of switching the screen in the maintenance management terminal 5 to display a volume screen, the management apparatus 43 creates the history information of [StsChg] [LogicalVolumeListScreen] [SwitchDisplay]. Moreover, if the user performs an operation of clicking the OK button on the Information screen of the maintenance management terminal 5, the management apparatus 43 creates the history information of [CompCtr] [Information_OKBTN] [Click]. In addition, if the user performs an operation of creating a 100 MB logical volume from Parity=1-1 (CU:LDEV=00:00) to the storage apparatus 4 in the maintenance management terminal 5, the management apparatus 43 creates the history information of [SetCtr] [Create_LogicalVolume] [Parity=1-1 CU:LDEV=00:00 Size=100MB]. Furthermore, if the user performs an operation of creating a user account [User01] in the maintenance management terminal 5, the management apparatus 43 creates the history information of [SetCtr] [Create_Account] [User01].

The user management module 804 includes a function of managing the user information such as authority information stored in the authority information storage unit 4333, and the maintenance management terminal operation controller 805 includes a function of controlling the application screen of the maintenance management terminal 5 to be operated by the user to perform the configuration setting in the storage apparatus 4. The storage apparatus configuration setting module 806 includes a function of performing the configuration setting in the controller unit 42 and the disk device 41.

Here, authority information refers to information concerning the authority of each user showing the program products and their functions that are operable by the user.

Meanwhile, the maintenance management terminal 5 includes a terminal operation unit 51. The terminal operation unit 51 is a function module that is configured by a CPU (not shown) of the maintenance management terminal 5 executing the corresponding program stored in a memory (not shown) of the maintenance management terminal 5. The terminal operation unit 51 includes a function of providing a user interface to the user for performing the configuration setting of the storage apparatus 4.

(3) Known Problem Information Distribution Function and Known Problem Occurrence Inhibition Function The known problem information distribution function and the known problem occurrence inhibition function loaded in the storage system are now explained.

The storage system 1 is loaded with an apparatus registration function of automatically storing the storage apparatus 4 in the information management server 7 when that storage apparatus 4 is initially started up or when the micro program that is loaded in the respective channel adapters 422 of the storage apparatus 4 is replaced, and a known problem information registration and distribution function of registering, at the stage that the vendor-side engineer of the storage apparatus 4 discovers that a problem will arise based on a specific operation or the like performed to that storage apparatus 4, information concerning that problem (known problem information) in the information management server 7 via the vendor terminal 6, and thereby selectively distributing such known problem information to the corresponding storage apparatuses 4 among the plurality of storage apparatuses 4 registered in the information management server 7.

In addition to the foregoing apparatus registration function and the known problem information distribution function, the storage system 1 is also loaded with a user operation inhibition function in which the storage apparatus 4 that acquired the known problem information inhibits the user from performing an operation that will cause that known problem to occur, and a known problem information display function of displaying the known problem information retained in the storage apparatus 4 on the maintenance management terminal 5 according to the user's operation.

The flow of various types of processing to be executed by the storage system 1 in relation to the foregoing functions is now explained.

(3-1) Apparatus Registration Processing

Figure 7:
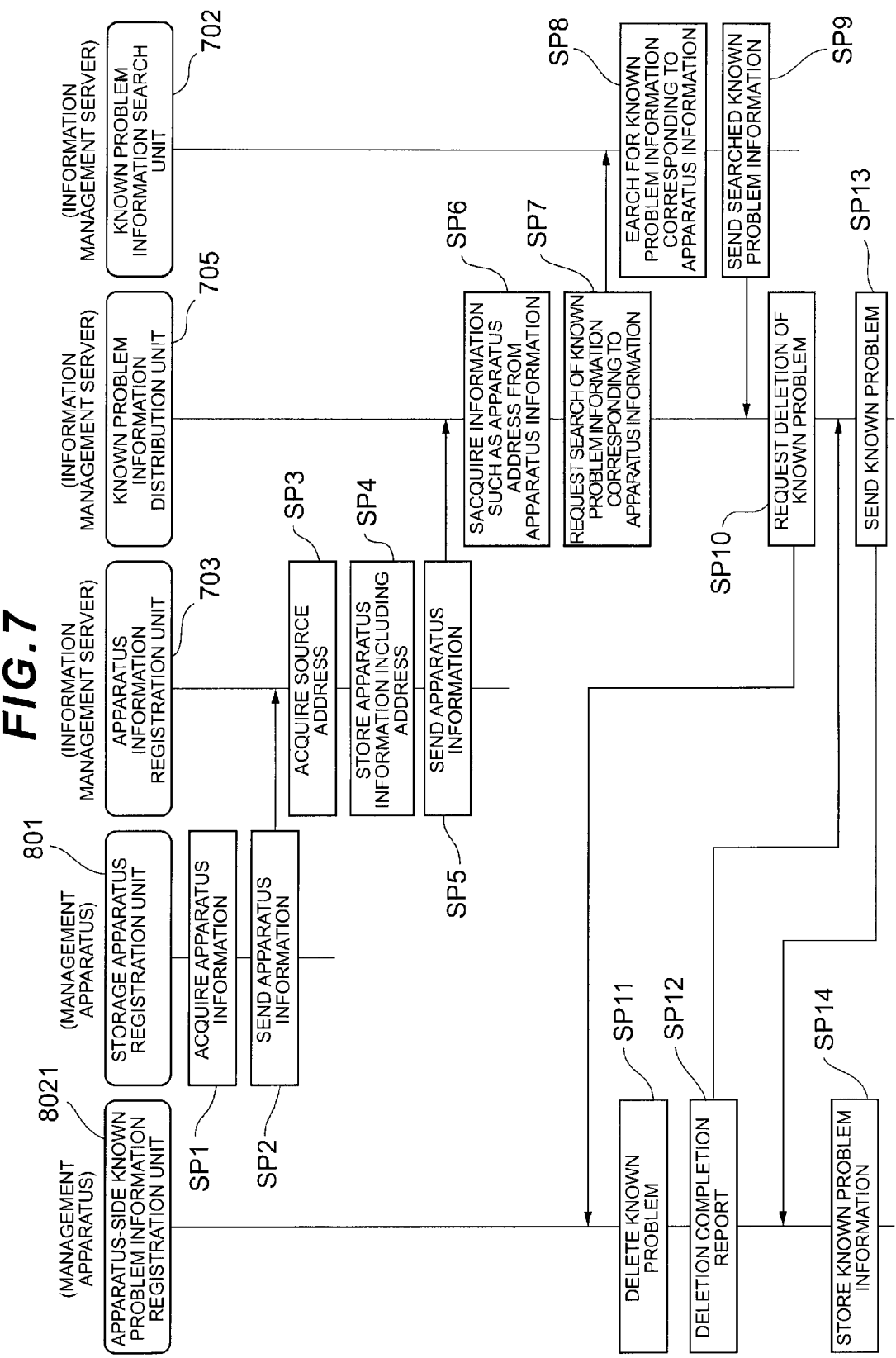
FIG. 7 is a sequence diagram showing the flow of apparatus registration processing.

FIG. 7 shows the flow of apparatus registration processing to be executed between the management apparatus 43 and the information management server 7 of the storage apparatus 4 in relation to the foregoing apparatus registration processing.

The storage apparatus registration unit 801 of the management apparatus 43 explained above with reference to FIG. 4 foremost acquires, when the storage apparatus 4 that it is managing is initially started up or the micro program to be executed by the respective channel adapters 422 of that storage apparatus 4 is replaced, the model and serial number of the storage apparatus 4 and the version of the micro program from that storage apparatus 4 (SP1), and notifies the acquired information to the apparatus information registration unit 703 of the information management server 7 (SP2).

When the apparatus information registration unit 703 receives the foregoing information, it acquires the source address of that information as the apparatus address (SP3), and stores the acquired apparatus address as well as the model and serial number of the storage apparatus 4 and the version of the micro program which are recognized from that information in the apparatus information storage unit 332 (FIG. 4) as the apparatus information of that storage apparatus 4 (SP4).

Here, the apparatus information registration unit 703 assigns a unique apparatus number for identifying the storage apparatus 4. The serial number of the storage apparatus 4 may be used as this apparatus number. Upon registering the apparatus information in the apparatus information storage unit 332, the apparatus information registration unit 703 overwrites the new apparatus information over the old apparatus information when the apparatus information regarding that storage apparatus 4 has already been stored in the apparatus information storage unit 332 (when the micro program of the storage apparatus 4 is replaced).

With the storage system 1, as a result of the foregoing processing being executed regarding the respective storage apparatuses 4 connected to the first network 3A (FIG. 1), the apparatus information of all storage apparatuses 4 connected to the first network 3A will be registered in the information management server 7.

The apparatus information registration unit 703 thereafter notifies the known problem information distribution unit 705 of the information management server 7 of the registration of the apparatus information of a new storage apparatus 4 or the storage apparatus 4 in which the micro program has been replaced as described above, together with such apparatus information (SP5).

The known problem information distribution unit 705 that received the foregoing notice acquires the various types of information including the apparatus address, model and version of the micro program of the corresponding storage apparatus 4 from the apparatus information that it received (SP6). Among the acquired information, the known problem information distribution unit 705 delivers information concerning the model and the micro program version of the storage apparatus 4 to the known problem information search unit 702 of the information management server 7, and requests the search of the corresponding known problem information (SP7).

When the known problem information search unit 702 receives the foregoing request, with the information concerning the model and the micro program version of the storage apparatus 4 that was delivered from the known problem information distribution unit 705 as the keyword, it reads all known problem information in which the "model" of the apparatus information coincides with the "distribution-target model" in the known problem information and in which the "micro program version" of the apparatus information is within the range of the "distribution-target micro version" in the known problem information among the known problem information stored in the server-side known problem information storage unit 331 (SP8), and sends the read known problem information to the known problem information distribution unit 705 (SP9).

The known problem information distribution unit 705 that received the foregoing known problem information uses the apparatus address included in the apparatus information that was sent from the apparatus information registration unit 703 at step SP45, and requests the apparatus-side known problem information registration unit 8021 of the corresponding management apparatus 43 to erase all known problem information stored in the apparatus-side known problem information storage unit 4331 (FIG. 4) of the management apparatus 43 (SP10).

Consequently, the apparatus-side known problem information registration unit 8021 that received the request erases all known problem information stored in the apparatus-side known problem information storage unit 4331 (SP11), and thereafter sends a deletion completion report, which indicates that the deletion of the known problem information is complete, to the known problem information distribution unit 705 of the information management server 7 (SP12).

The known problem information distribution unit 705 that received the foregoing deletion completion report sends the known problem information that was sent from the known problem information search unit 702 at step SP49 to the apparatus-side known problem information registration unit 8021 of the corresponding management apparatus 43 (SP13). Consequently, the apparatus-side known problem information registration unit 8021 that received the foregoing known problem information stores such known problem information in the apparatus-side known problem information storage unit 4331 (SP14).

As a result of the above, all storage apparatuses 4 that are connected to the first network 3A will be registered in the information management server 3, and all known problem information can be distributed to the management apparatus 43 of the storage apparatus 4 when that storage apparatus 4 is registered in the information management server 3.

(3-2) Known Problem Information Registration and Distribution Processing

Figure 8:
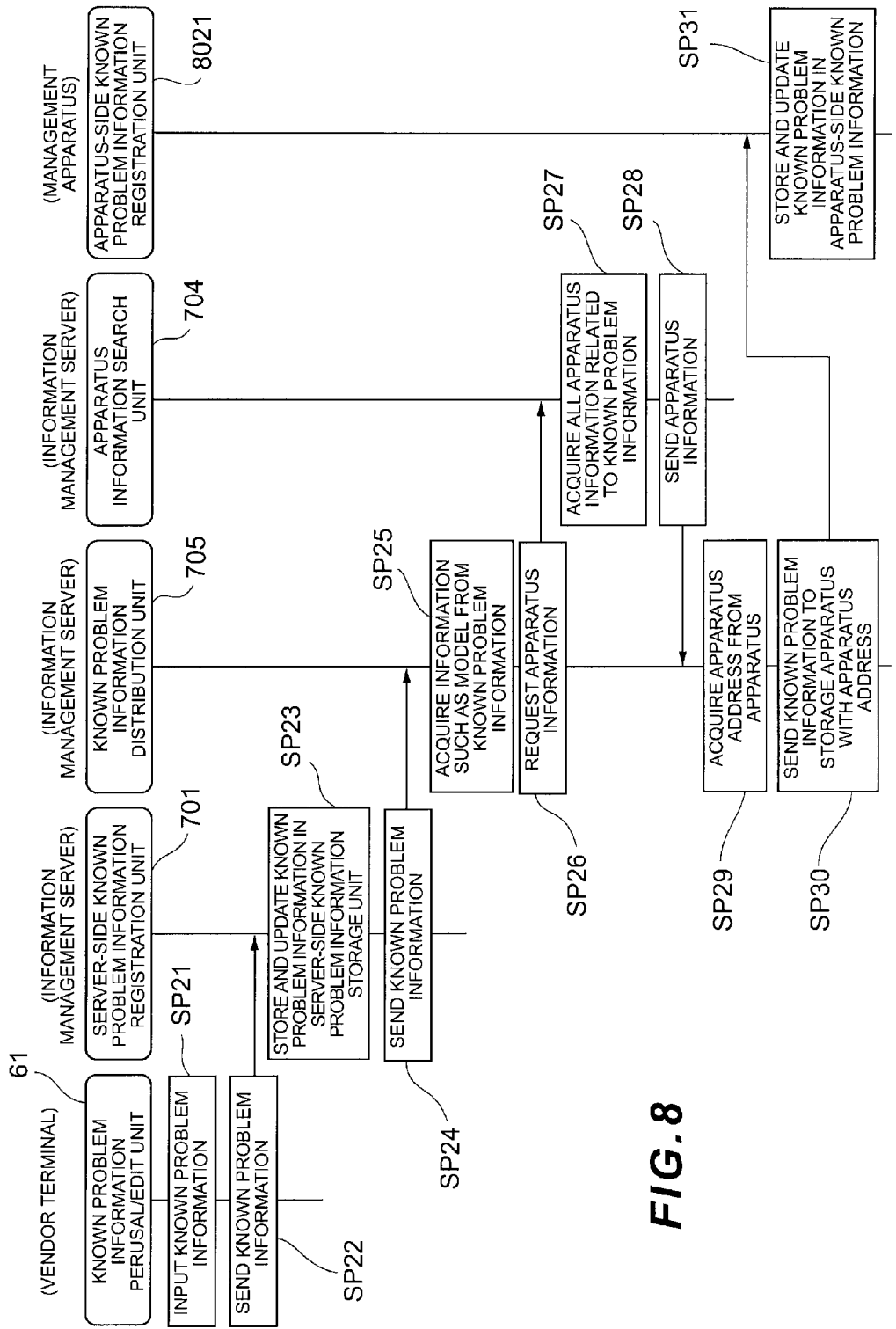
FIG. 8 is a sequence diagram showing the flow of known problem information registration and distribution processing.

Meanwhile, FIG. 8 shows the flow of known problem information registration and distribution processing to be executed among the vendor terminal 6, the information management server 7, and the management apparatus 43 in relation to the foregoing known problem information registration and distribution function.

The known problem information perusal/edit unit 61 of the vendor terminal 6 displays a screen for registering and editing the known problem information (this is hereinafter referred to as the "known problem information registration/edit screen") according to operations of the vendor's engineer or the like of the storage apparatus 4. When new known problem information is input or the previously registered known problem information is edited using the known problem information registration/edit screen, the known problem information perusal/edit unit 61 accepts such input or edit (SP21), and sends the newly input known problem information or the edited known problem information to the server-side known problem information registration unit 701 of the information management server 7 (SP22).

If the received known problem information is new, the server-side known problem information registration unit 701 newly stores this in the server-side known problem information storage unit 321 (FIG. 4), and, if the received known problem information is the edited version of the previously registered known problem information, the server-side known problem information registration unit 701 overwrites this on the corresponding known problem information that is registered in the server-side known problem information storage unit 321 (SP23). Here, if the received known problem information is new, the server-side known problem registration unit 701 assigns a document number and then stores that known problem information in the server-side known problem information storage unit 321. The server-side known problem registration unit 701 thereafter sends the received known problem information to the known problem information distribution unit 705 (SP24).

The known problem information distribution unit 705 acquires the information concerning the "distribution-target model" and the "distribution-target micro version" from the received known problem information (SP25), and sends the acquired information to the apparatus information search unit 704 together with the transfer request of the apparatus information of all storage apparatuses 4 to which the foregoing known problem information is to be distributed (SP26).

The apparatus information search unit 704 reads the apparatus information of all corresponding storage apparatuses 4 from the apparatus information storage unit 332 by searching for the storage apparatuses 4 in which the "model information" of the apparatus information coincides with the "distribution-target model" and in which the "micro program version" of the apparatus information is within the range of the "distribution-target micro version" based on the information concerning the "distribution-target model" and the "distribution-target micro version" that was sent from the known problem information distribution unit 705 (SP27). The apparatus information search unit 704 sends the read apparatus information to the known problem information distribution unit 705 (SP28).

The known problem information distribution unit 705 that received the foregoing apparatus information extracts the "apparatus address" from that apparatus information for each piece of apparatus information (SP29), and sends the known problem information provided from the server-side known problem information registration unit 701 at step SP24 to the apparatus-side known problem information registration unit 8021 of the management apparatus 43 of the storage apparatus 4 having that address (SP30).

Consequently, if the received known problem information is new information, the apparatus-side known problem information registration unit 8021 newly stores this in the apparatus-side known problem storage unit 4321, and, if the received known problem information is an edited version of the previously registered known problem information, the apparatus-side known problem information registration unit 8021 stores this in the apparatus-side known problem storage unit 4331 so as to overwrite the edited version on the corresponding known problem information (SP31).

As a result of the above, the known problem information that was registered by the vendor can be instantaneously distributed to the target storage apparatus 4.

The timing of distributing the known problem information to the management apparatus 43 of the corresponding storage apparatus 4 may be other than the timing that the known problem information is newly registered in the information management server 7 or the known problem information registered in the information management server 7 is updated and, for instance, the known problem information may be distributed collectively and periodically.

(3-3) User Operation Inhibition Processing

Figure 9:
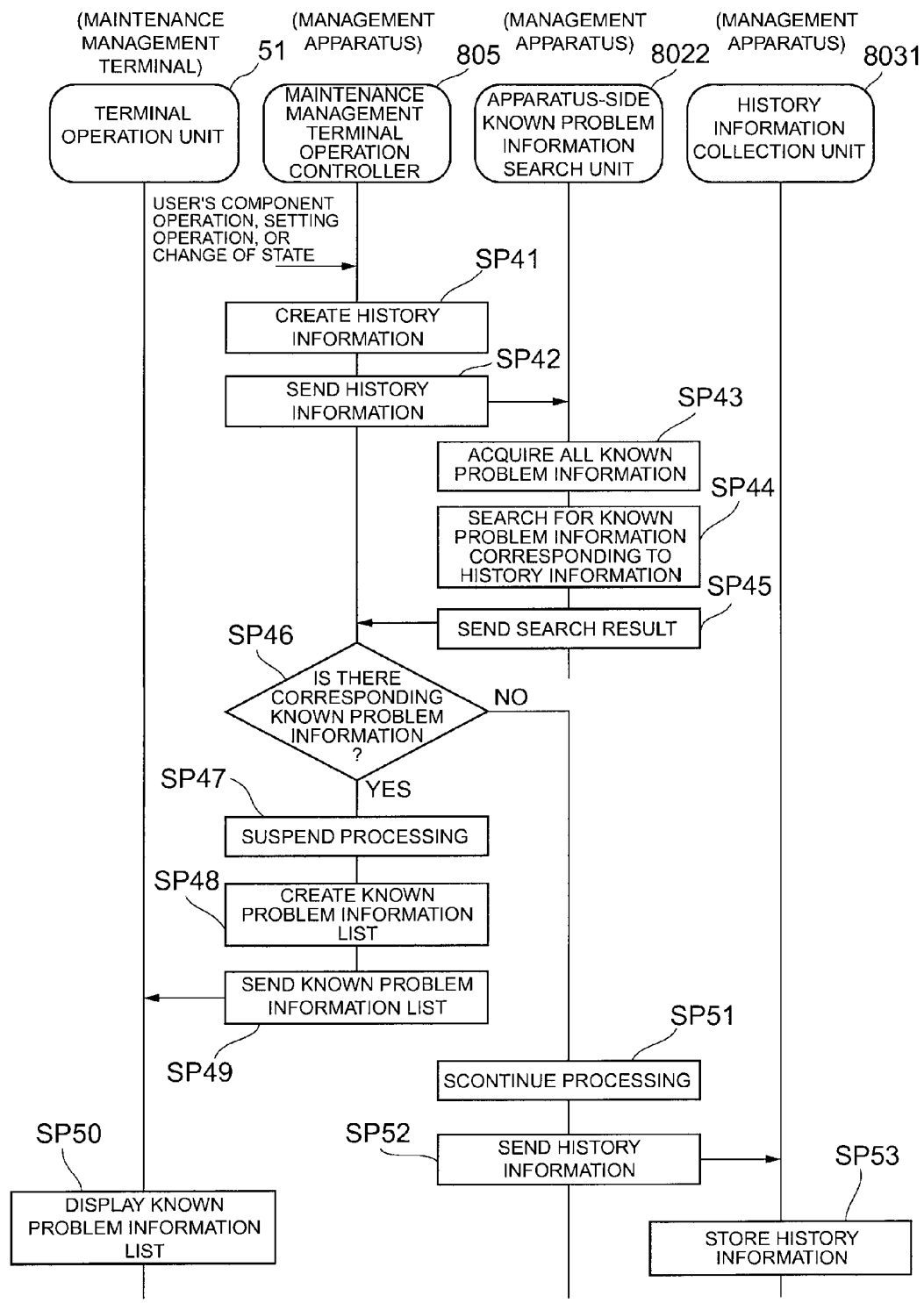
FIG. 9 is a sequence diagram showing the flow of user operation inhibition processing.

FIG. 9 shows the flow of user operation inhibition processing to be executed by the maintenance management terminal 5 and the management apparatus 43 in relation to the foregoing user operation inhibition function. Incidentally, the maintenance management terminal operation controller 805 of the management apparatus 43 and the terminal operation unit 51 of the maintenance management terminal 5 operate in synch, and operate as the storage maintenance application.

Specifically, when the user performs the component operation or the setting application operation with the maintenance management terminal 5 or the status of the storage maintenance application is changed, the maintenance management terminal operation controller 805 creates history information concerning that processing before the start of that processing (SP41). The maintenance management terminal operation controller 805 thereafter sends the created history information to the apparatus-side known problem information search unit 8022 (FIG. 4), and requests the search of the known information that coincides with the history information (SP42).

When the apparatus-side known problem information search unit 8022 receives the foregoing search request, and acquires all known problem information from the apparatus-side known problem information storage unit 4331 (SP43). The apparatus-side known problem information search unit 8022 searches whether the "problematic operation/change of state information" included in the known problem information acquired at step SP43 coincides with the history information that was sent from the maintenance management terminal operation controller 805 at step SP42 (SP44).

If there is any coinciding known problem information, the apparatus-side known problem information search unit 8022 sends the searched known problem information to the maintenance management terminal operation controller 805 (SP45). Meanwhile, if there is no coinciding known problem information, the apparatus-side known problem information search unit 802 sends the search result to the maintenance management terminal operation controller 805 (SP45).

The only time that the history information and known problem information are determined to coincide regarding the "problematic operation/change of state information" is when all of the following conditions are satisfied:

(a) The "type" of history information and the "type" of "problematic operation/change of state information" coincide; provided, however, that if the "type" of "problematic operation/change of state information" is "Any," this is unconditionally determined as coinciding regardless of the "type" of history information.

(b) The "type" of history information and the "item" of "problematic operation/change of state information" coincide; provided, however, that if the "item" of "problematic operation/change of state information" is "Any," this is unconditionally determined as coinciding regardless of the "item" of history information.

(c) The "additional information" of history information and the "additional information" of "problematic operation/change of state information" coincide; provided, however, that if the "additional information" of "problematic operation/change of state information" is "Any," this is unconditionally determined as coinciding regardless of the "additional information" of history information.

If all of the foregoing conditions (a) to (c) are satisfied, the apparatus-side known problem information search unit 8022 determines that the description of the "problematic operation/change of state information" of the known problem information coincides with the history information. There are cases where "problematic operation/change of state information" of the known problem information is registered a plurality of operation patterns. In the foregoing case, the apparatus-side known problem information search unit 8022 determines this to be coinciding so as long as at least one of the patterns coincides.

Subsequently, the maintenance management terminal operation controller 805 determines whether there is any known problem information in which the description of the "problematic operation/change of state information" coincides with the history information based on the result of the foregoing search conducted by the apparatus-side known problem information search unit 8022 (SP46).

If the maintenance management terminal operation controller 805 obtains a positive result in the foregoing determination, it suspends all processing (SP47), creates a list of the searched known problem information (SP48), and sends the created known problem information list to the maintenance management terminal 5 (SP44). Consequently, the terminal operation unit 51 of the maintenance management terminal 5 displays the received known problem information list, for example, as shown in FIG. 10 (SP10).

Meanwhile, if the maintenance management terminal operation controller 805 obtains a negative result in the determination at SP46, it continues the processing (SP51), and sends the history information to the history information collection unit 8031 (SP52).

The history information collection unit 8031 stores the received history information in the history information storage unit 4332 (FIG. 4) (SP13), and thereby ends this processing. Simultaneously, if the operation that was being performed by the user with the maintenance management terminal 5 was a setting operation, the maintenance management terminal operation controller 805 requests the storage apparatus configuration setting module 806 perform a setting corresponding to the user's operation, and thereby ends this processing.

For example, if the description of the "problematic operation/change of state information" of the known problem information is [SetCtr] [Create_LogicalVolume] [Any], and the problematic operation is the creation of a logical volume, the operation of [SetCtr] [Create_LogicalVolume] [Parity=1-1 CU:LDEV=00:00 Size=100MB]; that is, the volume creation operation of creating a 100 MB logical volume from Parity=1-1 (CU:LDEV=00:00) will be inhibited. Meanwhile, the operation of [SetCtr] [Delete_Logical Volume] [CU:LDEV=00:00]; that is, the volume deletion operation will not be inhibited, and it is thereby possible to inhibit only the volume creation operation.

According to the above, it is possible to inhibit the user operation that will induce the known problem.

(3-4) Known Problem Information Display Processing

FIG. 11 shows the flow of known problem information display processing to be executed by the maintenance management terminal 5 and the management apparatus 43 in relation to the foregoing known problem information display function.

In the foregoing case, the terminal operation unit 51 of the maintenance management terminal 5 requests the maintenance management terminal operation controller 805 of the management apparatus 43 to display the known problem information list in accordance with the user's operation (SP61).

The maintenance management terminal operation controller 805 that received the foregoing request requests the user management module 804 to acquire the authority information as information concerning the product programs and their functions that are operable by the user according to the request of the terminal operation unit 51 (SP62).

In response to the request from the maintenance management terminal operation controller 805, the user management module 804 acquires the authority information of the corresponding user from the authority information storage unit 4333 (FIG. 4) (SP63), and sends the acquired authority information to the maintenance management terminal operation controller 805 (SP64). When the maintenance management terminal operation controller 805 receives the foregoing authority information, it sends the received authority information to the apparatus-side known problem information search unit 8022 (SP65).

The apparatus-side known problem information search unit 802 that received the authority information compares the program products and their functions included in the authority information with the program products and their functions that are indicated in the "related keyword" column of the known problem information, and acquires all known problem information that partially coincide (SP66). The apparatus-side known problem information search unit 802 sends all acquired known problem information to the maintenance management terminal operation controller 805 (SP67).

When the maintenance management terminal operation controller 805 receives the foregoing known problem information, it creates a list of such known problem information list (SP68), and sends the data of the created list to the terminal operation unit 5 of the maintenance management terminal 5 (SP69). Consequently, when the maintenance management terminal operation controller 805 receives the foregoing data, it displays the known problem information list based on such data (SP70).

As a result of the above, it is possible to present to the user only the known problem information concerning the program products and their functions in which that user is authorized to use.

(4) Effect of Present Embodiment

As described above, since the storage system 1 of this embodiment is able to inhibit the user operation which may cause a known problem in the storage apparatus 4, it is possible to effectively prevent such known problem from occurring, whereby a highly reliable storage system can be realized.

Moreover, the storage system 1 is able to distribute the known problem information registered by a vendor to a plurality of storage apparatuses 4 that are subject to the known problem information. Consequently, it is possible to streamline the vendor's business operation. In addition, the storage apparatuses will constantly be aware of the latest known problem information.

Moreover, during the startup of the storage apparatus or after the replacement of the micro program, the information management server 3 is able to register the apparatus information of the storage apparatus, and the information management server 3 is able to distribute all known problem information concerning the registered storage apparatus to the management apparatus 43. Consequently, the storage apparatus will possess the latest known problem information during its startup or after the replacement of the micro program.

Furthermore, the management apparatus is able to present to the user only the known problem information concerning the program products and their functions in which that user is authorized to use. Consequently, it is possible to increase the safety of the information.

(5) Other Embodiments

Although the foregoing embodiment explained a case where the host 2 and the storage apparatus 4 were connected via the first network 3A, and the information management server 7 and the storage apparatus 4 were connected via the second network [3B], the present invention is not limited thereto, and the host 2 and the storage apparatus 4, and the information management server 7 and the storage apparatus 4 may be connected directly without going through the first or second network 3A, 3B. In the foregoing case, for instance, various types of protocols such as FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark) and the like may be used.

In addition, although the foregoing embodiment explained a case of incorporating the management apparatus 43 into the storage apparatus 4, the present invention is not limited thereto, and the management apparatus 43 may also be provided outside of the storage apparatus 4, or incorporated into the controller unit 42.

Moreover, although the foregoing embodiment explained a case of loading the storage management program 4323 for managing the storage apparatus 4 in the management apparatus 43, the present invention is not limited thereto, and the storage management program 4323 may also be loaded in the host 2, and the host 2 may manage the storage apparatus 4 via the first network 3A based on the storage management program 4323.

Furthermore, although the foregoing embodiment did not refer to the conditions for displaying the known problem information, if there are multiple pieces of known problem information to be displayed on the maintenance management terminal, the error message may be displayed by giving preference to the known problem information with a high [degree of urgency], or the error message may be displayed by giving preference to the known problem information related to operations that are performed frequently.

In addition, although the foregoing embodiment explained a case where the known problem information perusal/edit unit 61 of the vendor terminal 6; the server-side known problem information registration unit 701, the server-side known problem information search unit 702, the apparatus information registration unit 703, the apparatus information search unit 704, the known problem information distribution unit 705 and the server-side known problem information storage unit 331 of the information management server 7; the storage apparatus registration unit 801, the known problem information management module 802, the history information management module 803, the user management module 804, the maintenance management terminal operation controller 805 and the storage apparatus configuration setting module 806 of the management apparatus 43; and the terminal operation unit 51 of the maintenance management terminal 5 are configured from software, the present invention is not limited thereto, and the foregoing components may also be configured from hardware.

INDUSTRIAL APPLICABILITY

The present invention can be broadly applied to storage system of various configurations.

The invention claimed is:

1. A storage system comprising one or more computers, comprising:
a storage apparatus including a storage medium for storing data; and
a management apparatus configured to manage the storage apparatus,
an information management server configured to manage apparatus information of the storage apparatus and known problem information;
wherein the management apparatus comprises:
an apparatus-side known problem information storage unit for storing the known problem information as information concerning a problematic operation or a change of state;
a history information creation unit configured to receive a user's operation or change of state and create history information according to the operation or change of state;
a known problem information search unit configured to search, from the apparatus-side known problem information storage unit, the known problem information corresponding to the history information created by the history information creation unit; and
an operation inhibition unit configured to inhibit the operation of the known problem information that was searched by the known problem information search unit;
wherein the information management server comprises:
a server-side known problem information storage unit for storing known problem information corresponding to the apparatus information of a plurality of storage apparatuses; and
an apparatus information storage unit for storing the apparatus information of the storage apparatus;
wherein the management apparatus is configured to send the apparatus information of the storage apparatus to the information management server during the startup of the storage apparatus or after the replacement of a micro program in the storage apparatus,
wherein the information management server is configured to search for the known problem information corresponding, to the apparatus information, which was sent by the management apparatus, from the server-side known problem information storage unit, and send the searched known problem information to the management apparatus,
wherein the management apparatus is configured to store the known problem information sent by the information management server in the apparatus-side known problem information storage unit,
wherein the information management server is configured to receive the known problem information from an external terminal according to an input of an administrator, store the received known problem information in the server-side known problem storage unit, search for apparatus information corresponding to the stored known problem information from the apparatus information storage unit, and send the received known problem information to the management apparatus corresponding to the searched apparatus information,
wherein the management apparatus is configured to store the known problem information sent by the information management server in the apparatus-side known problem information storage unit,
wherein the information management server is configured to search for the known problem information corresponding to the apparatus information sent by the management apparatus from the server-side known problem information storage unit, and send a request to the management apparatus for discarding all known problem information stored in the apparatus-side known problem information storage unit,
wherein the management apparatus is configured to discard, in response to the request, all known problem information stored in the apparatus-side known problem information storage unit,
wherein the information management server is configured to send all known problem information that was searched to the management apparatus, and
wherein the management apparatus is configured to store all known problem information that was sent by the information management server in the apparatus-side known problem information storage unit.

2. The storage system according to claim 1,
wherein the information management server is configured to store the apparatus information sent by the management apparatus in the apparatus information storage unit.

3. The storage system according to claim 1,
wherein the management apparatus further comprises:
an authority information storage unit for storing authority information showing program products and their functions which are available for each user, and
wherein the management apparatus is configured to acquire upon receiving a display request of a known problem information list from a user, authority information of the user from the authority information storage unit, search for known problem information corresponding to the authority information that was acquired from the apparatus-side known problem information storage unit, create the searched known problem information list, and display the created known problem information list on an external terminal.

4. The storage system according to claim 1,
wherein the management apparatus is configured to create the known problem information list that was searched by the known problem information search unit and display it on an external terminal if the operation inhibition unit inhibits the operation of the known problem information.

5. A storage system comprising one or more computers, comprising:
a storage apparatus including a storage medium for storing data and
a management apparatus configured to manage the storage apparatus;
wherein the management apparatus comprises:
an apparatus-side known problem information storage unit for storing known problem information as information concerning a problematic operation or a change of state;
a history information creation unit configured to receive a user's operation or change of state and create history information according to the operation or change of state;
a known problem information search unit configured to search, from the apparatus-side known problem information storage unit, the known problem information corresponding to the history information created by the history information creation unit; and
an operation inhibition unit configured to inhibit the operation of the known problem information that was searched by the known problem information search unit;
wherein the management apparatus is configured to cause the storage apparatus to perform processing corresponding to a user's operation if there is no known problem information corresponding to the history information as a result of the search conducted by the known problem information search unit.

6. A method of managing known problem information of a storage system which comprises a storage apparatus including a storage medium for storing data, and a management apparatus including an apparatus-side known problem information storage unit for storing known problem information as information concerning a problematic operation or a change of state, and for managing the storage apparatus, comprising:
receiving, by the management apparatus, a user's operation or change of state;
creating, by the management apparatus, history information according to the operation or change of state;
searching, by the management apparatus, from the apparatus-side known problem information storage unit, the known problem information corresponding to the history information;
inhibiting, by the management apparatus, the operation of the known problem information if the known problem information corresponding to the history information was found as a result of the search conducted; and
causing, by the management apparatus, the storage apparatus to perform processing corresponding to a user's operation if there is no known problem information corresponding to the history information as a result of the search conducted.

7. The method of managing known problem information according to claim 6 of a storage system which further comprises an information management server including a server-side known problem information storage unit for storing known problem information corresponding to the apparatus information of a plurality of storage apparatuses, and for managing apparatus information of the storage apparatus and the known problem information, further comprising:
sending, by the management apparatus, the apparatus information of the storage apparatus to the information management server during the startup of the storage apparatus or after the replacement of a micro program in the storage apparatus;
searching, by the information management server, the known problem information corresponding to the apparatus information, which was sent by the management apparatus, from the server-side known problem information storage unit;
sending, by the information management server, the searched known problem information to the management apparatus; and
storing by the management apparatus, the sent known problem information in the apparatus-side known problem information storage unit.

8. The method of managing known problem information according to claim 7, wherein the information management server further comprises a server-side apparatus information storage unit for storing the apparatus information of the storage apparatus, further comprising:
receiving, by the information management server, known problem information from an external terminal according to an input of an administrator;
storing, by the information management server, the received known problem information in the server-side known problem storage unit;
searching, by the information management server, apparatus information corresponding to the stored known problem information from the apparatus information storage unit;
sending, by the information management server, the received known problem information to the management apparatus corresponding to the searched apparatus information; and
storing, by the management apparatus, the known problem information sent by the information management server in the apparatus-side known problem information storage unit.

9. The method of managing known problem information according to claim 8, wherein the management apparatus further comprises an authority information storage unit for storing authority information showing program products and their functions which are available for each user, further comprising:
acquiring, by the management apparatus, upon receiving a display request of a known problem information list from a user, authority information of the user from the authority information storage unit;

searching, by the management apparatus, known problem information corresponding to the authority information that was acquired from the apparatus-side known problem information storage unit;

creating by the management apparatus the searched known problem information list; and displaying, by the management apparatus, the created known problem information list on an external terminal.

10. The method of managing known problem information according to claim 8, further comprising:

searching, by information management server, the known problem information corresponding to the apparatus information sent by the management apparatus from the server-side known problem information storage unit;

sending, by the information management server, a request to the management apparatus for discarding all known problem information stored in the apparatus-side known problem information storage unit;

discarding, by the management apparatus, in response to the request, all known problem information stored in the apparatus-side known problem information storage unit;

sending, by the information management server, all known problem information that was searched to the management apparatus; and storing, by the management apparatus, all known problem information that was sent by the information management server in the apparatus-side known problem information storage unit.

11. The method of managing known problem information according to claim 6, further comprising:

creating, by the management apparatus, the known problem information list that was searched by the known problem information search units; and displaying, by the management apparatus, the created known problem information list on an external terminal if the operation of the known problem information is inhibited.

* * * * *